E. B. ALLEN.
BUTTONHOLE CUTTING MECHANISM.
APPLICATION FILED NOV. 23, 1910.
1,048,786.
Patented Dec. 31, 1912.
4 SHEETS—SHEET 1.
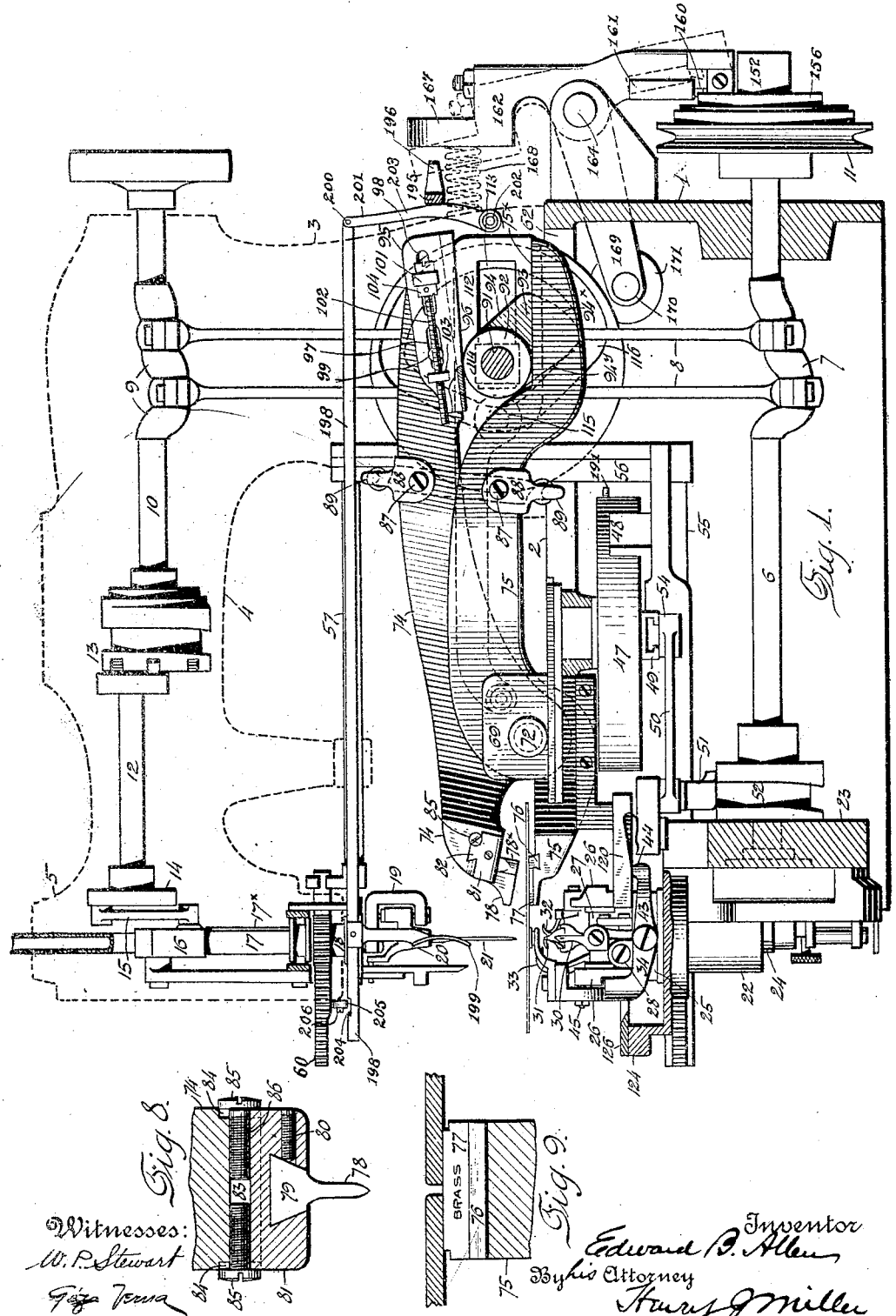
Witnesses:
W. P. Stewart
Géza Tensa
Inventor
Edward B. Allen
By his Attorney
Harry J. Miller E. B. ALLEN.
BUTTONHOLE CUTTING MECHANISM.
APPLICATION FILED NOV. 23, 1910.
1,048,786.
Patented Dec. 31, 1912.
4 SHEETS—SHEET 2.
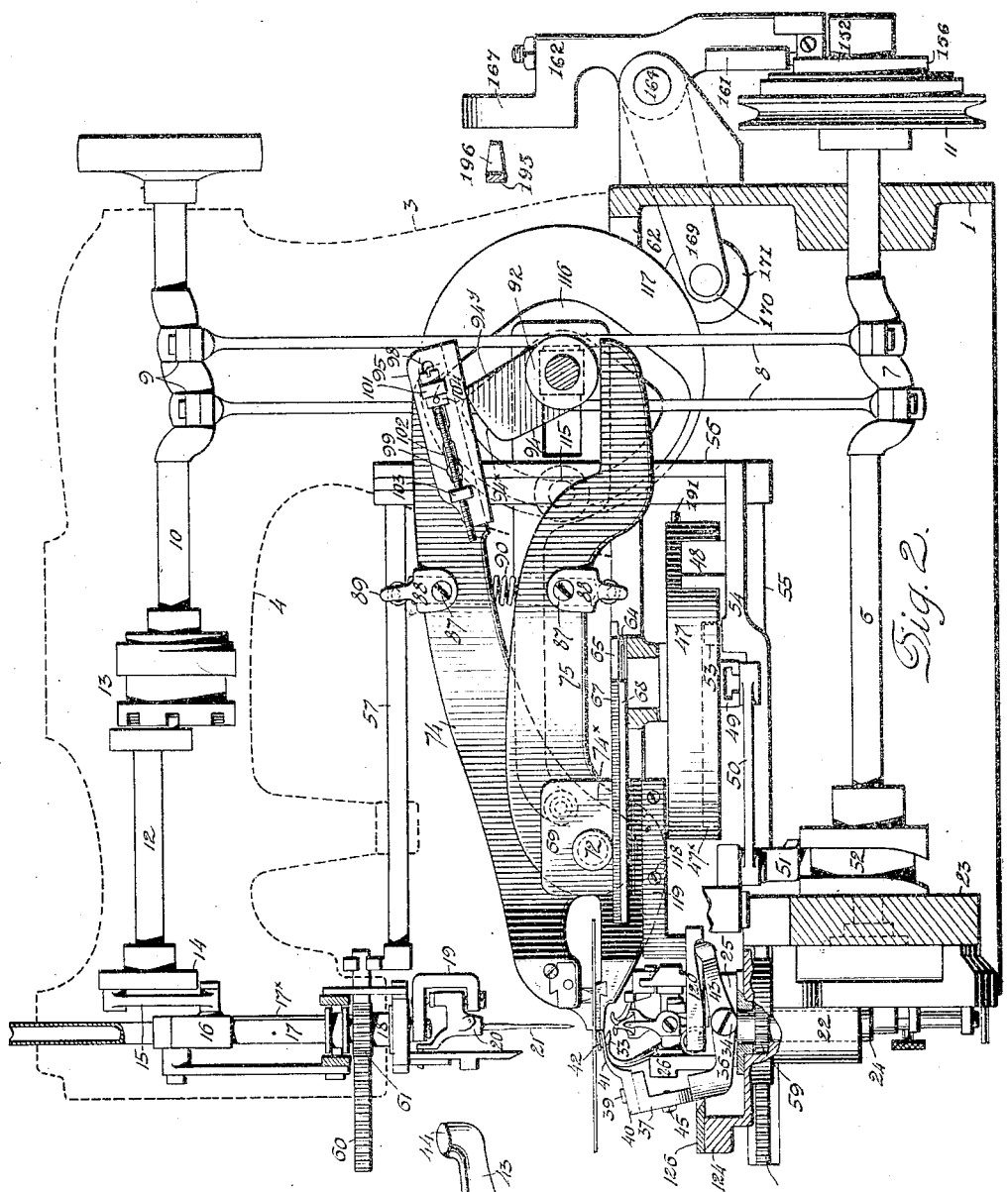
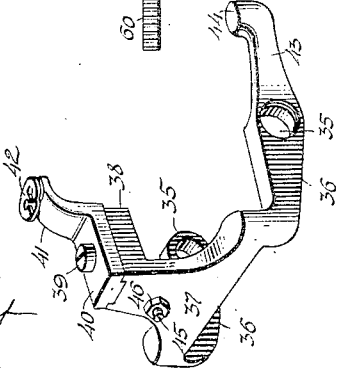
Witnesses:
W. P. Stewart
Géza Verna
Inventor
Edward B. Allen
By his Attorney
Henry J. Miller

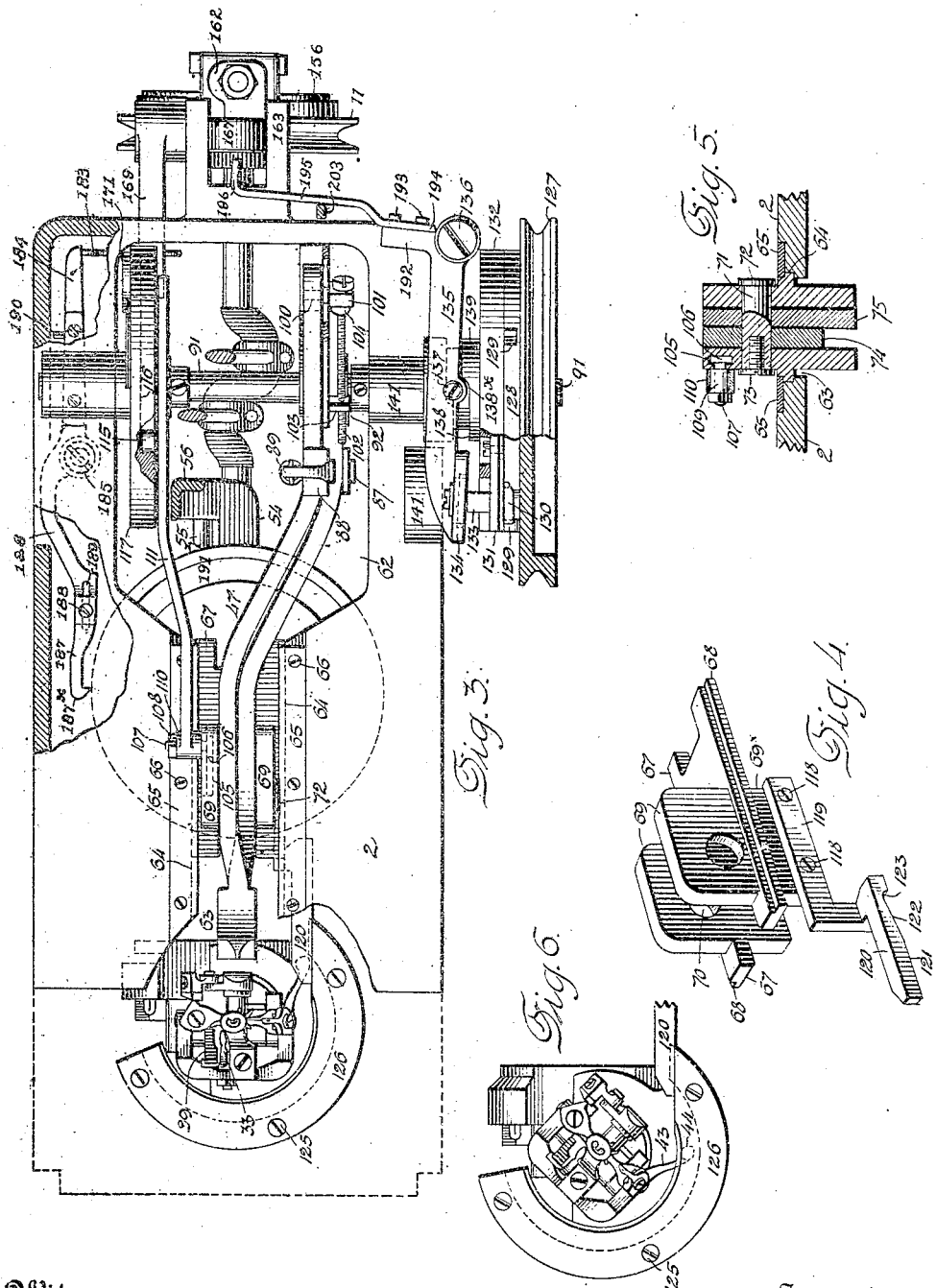

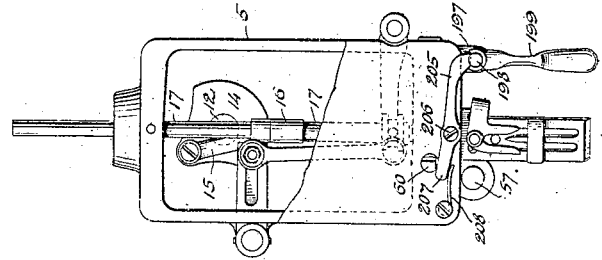

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

BUTTONHOLE-CUTTING MECHANISM.

1,048,786.   Specification of Letters Patent.   Patented Dec. 31, 1912.

Application filed November 23, 1910. Serial No. 593,784.

*To all whom it may concern:*

Be it known that I, EDWARD B. ALLEN, a citizen of the United States, residing at Bridgeport, in the county of Fairfield and State of Connecticut, have invented certain new and useful Improvements in Buttonhole-Cutting Mechanisms, of which the following is a specification, reference being had therein to the accompanying drawings.

This invention has for its object to provide a simple and effective buttonhole cutting mechanism operating with precision and with the requisite power to perform its function as required. In its most approved embodiment, it is applied to a buttonhole stitching machine having rotary stitch-forming mechanism with a laterally shifting needle-throat adapted to be temporarily displaced during the cutting operation; and it comprises a pair of cutter-levers provided with any suitable or usual form of coöperating cutting members and mounted upon a fulcrum-pin near the operative ends and carried by a longitudinally traveling slide-block sustained by the work-plate of the machine, the oppositely extending end portions or tails of the levers being connected by a spring and embracing an actuating shaft carrying a cam for forcing the tails of such levers apart to bring their cutting members together upon the work. The laterally movable needle-throat is carried by a rocking frame mounted upon the rotary loop-taker support with a transverse fulcrum intersecting the axis of rotation and provided with a rigid arm adapted for initial engagement with a cam-bar sustained by the traveling fulcrum-carrying slide-block. The cam-bar is so formed that in the advance of the lower cutting member to operative position within the range of action of the stitch-forming mechanism, and in the consequent engagement of such cutting member with the needle-throat, its rocking frame is permitted to tilt, but is caused to return to operative position by the action of the cam-bar upon its rigid arm in the recession of the slide-block and the cutter-levers to inoperative position.

The invention will be understood by reference to the accompanying drawings, in which—

Figure 1 is a partial side elevation of a buttonhole cutting and stitching machine embodying the present improvement, with the cutting mechanism in retracted or inoperative position, and the frame indicated partly in dotted lines and partly in section, and Fig. 2 a similar view with the cutting mechanism in operative position. Fig. 3 is a sectional plan representing the cutting mechanism and other parts of the machine below the level of the work-plate. Fig. 4 is a perspective view of the traveling fulcrum-carrying slide-block or carriage, and Fig. 5 a transverse sectional elevation of the same with a portion of the bed-plate. Fig. 6 is a plan of the loop-taker mechanism partly turned, as when stitching the eyelet end of a buttonhole. Fig. 7 is a perspective view of the needle-throat and its rocking frame. Fig. 8 is a transverse sectional view of the front end of the upper cutting lever with its cutting member, and Fig. 9 a similar view of the lower cutting lever and its cutting member with a section of material resting thereon. Fig. 10 is a rear end view of the lower part of the machine with the bed partially in section, and Fig. 11 a partial sectional side elevation of the same. Fig. 12 is a detail view of the clutch-wheel upon the lower longitudinal shaft. Figs. 13 and 14 are detail perspective views representing the cutter-shaft clutch device and Figs. 15 and 16 are, respectively, a side view and a transverse section of the cam-lever of said clutch-device. Fig. 17 is a front end view of the head of the bracket-arm with certain parts sustained thereby. Fig. 18 shows the cam 139 detached.

The machine represented in the drawings is that forming the subject of my pending application Serial No. 590,269, filed November 2, 1910, and constructed in substantial accordance with that represented in my pending application Serial No. 535,340, filed December 28, 1909, with the exception more particularly of the stitch-forming and cutting mechanisms. It is constructed with the hollow rectangular base 1 with bed-plate 2 from the rear end of which rises the hollow standard 3 of the bracket-arm having the forwardly extending member 4 with hollow head 5. The main or driving shaft 6 is mounted in and longitudinally of the base 1 and is provided with quartering cranks 7 connected by means of pitmen 8 with similar cranks 9 of the upper or needle-driving shaft 10 journaled in the bracket-arm member 4. The main-shaft 6 is provided upon its rearward end with the grooved loose belt-wheel 11 controlled in its operative connection with the shaft 6 by means of an automatically actuated clutch device.

The needle-driving shaft 10 is connected with the intermediate shaft 12 by means of a trammel device 13 for imparting two rotations of the latter to one of the former, and the shaft 12 carries a crank-plate 14 having a pin connected by means of the pitman 15 with a similar pin upon a loose collar 16 fitted to and confined from endwise movement upon the rectilinearly reciprocating needle-bar 17 having its lower bearing in the rotary bushing 18 in which it is locked from rotation by means of the spline $17^x$ and carrying upon its lower end the yoke 19 in which is journaled the laterally jogging needle-clamp 20 carrying the needle 21.

Journaled in a hollow boss 22 carried by a depending hanger 23 of the machine bed is a rotary bushing 24 formed at its upper end with a head 25 affording a loop-taker support, which is provided with the spaced bearing bosses 26 carrying the transverse fulcrum upon which the hub 27 of the looper-carrier is mounted, and provided also with lugs 28 supporting the fulcrum-pin of the loop-detainer carrier 29. Upon the looper-carrier are fixed the reversely directed threaded and non-threaded loopers 30 and 31 overlying the latter of which is the pivotally mounted spreader 32, while upon the loop-detainer carrier 29 is fixed the loop-detainer 33 coöperating with the threaded looper. Suitable operative connections are provided between the main-shaft and the looper-carrier and loop-detainer carrier, respectively, whereby the several lower-thread handling members receive their operative movements for coöperating with the reciprocating and laterally jogging needle, all as fully set forth in my said application Serial No. 590,269.

The looper-support 25 carries the diametrically arranged screw-studs 34 entering bearing apertures 35 in the lateral arms 36 of the rocking frame 37 having in its upper end the inwardly extending lug 38 longitudinally grooved in its upper face to form a seat upon which is secured by means of the screw 39 the foot 40 of an upwardly and laterally extending bracket 41 carrying the needle-throat 42. The arm 36 of the needle-throat frame nearest the front, in the initial position of the parts, has a forward extension 43 with an upwardly extending knob or projection 44 at its extremity and whose function will be later described. The rocking frame 37 is provided with a transverse adjusting screw 45 whose point rests against the bearing boss 26 of the loop-taker support and is locked from turning by means of the set-nut 46. By this means the position of the needle-throat may be adjusted relative to the plane of the jogging movements of the needle.

In practice the machine is provided with the usual traveling work-clamp sustained by the bed-plate 2 and deriving its longitudinal feeding movements and side shift movements from suitable operative connections with the feed-cam 47 deriving step-by-step rotary movements from the clutch-dog 48 connected with a vibratory lever 49 receiving operative movements through the link 50 from a vibratory lever 51 actuated by the cam 52 upon the main-shaft 6, as fully described in my said application Serial No. 535,340.

The feed-cam 47 is formed in its lower face with a groove $47^x$ entered by a stud 53 carried by a bar 54 secured to the lower slide-bar 55 suitably journaled in bearings of the base 1 and attached at its rearward end to the lower end of the crosshead 56 whose upper end is attached to the slide-bar 57 journaled in suitable bearings of the bracket-arm. The lower slide-bar 55 is formed at its forward end with a series of lateral rack-teeth 58 meshing with the teeth of a pinion 59 fixed upon the rotary bushing 24; while the upper slide-bar 57 is connected with a laterally toothed rack-bar 60 meshing with a pinion 61 fixed upon the needle-bar bushing 18. By these means, the upper and lower members of the stitch-forming mechanism derive step-by-step semi-rotations during the stitching of the eyelet ends of the buttonholes, whereby stitches are laid radially around the edges thereof. Any suitable or usual means may be provided for returning the rack-bars 58 and 60 to initial position subsequent to their operative movement for turning the stitch-forming mechanism during the buttonhole eye-stitching operation, and after the arrest of the stitch-forming mechanism at the completion of a buttonhole. According to the present invention, and as described more particularly in my said pending application Serial No. 535,340, this return movement of the rack-bars is effected by means of the feed-cam 47 whose operative movement is continued after the driving shaft 6 comes to rest.

Beneath the hollow standard 3 of the bracket-arm the bed-plate 2 is formed with an opening 62 for certain operative parts of the machine, this opening being connected by the reduced channel-way 63 with the front of the machine, along the opposite edges of which in the upper side of the bed-plate are formed the parallel notches 64 covered by the overhanging edges of the strips 65 secured to the bed-plate by means of screws 66 so as to afford lateral slideways in the opposite edges of the channel-way. The fulcrum-carrying slide-block comprises the flat plate 67 formed with the laterally extending tongues 68 entering the slideways of the channel-way 63 and provided with the spaced lugs 69 provided with the alined transverse apertures 70 for the fulcrum-pin 71 confined therein by means of the enlarged head 72 at one end and the head of the screw 73 tapped into the opposite end.

Mounted upon the fulcrum-pin 71 are the upper and lower cutter-levers 74 and 75, respectively, each being provided with a transverse aperture near its forward or operative end to receive such fulcrum-pin and the upper lever having a depending ear 74$^x$ in which its fulcrum aperture is formed. The forwardly projecting arm of the lower cutter-lever is formed with a transverse dove-tailed seat entered by the correspondingly shaped tongue 76 of the lower cutter member 77, in the form of an anvil or cutter-block having a flat operative face to receive the operative edge of the upper or primary cutter-member 78 in the form of a somewhat blunt-edged knife with the enlargement 78$^x$ for cutting out the eye portion of the buttonhole slit. The knife 78 extends downwardly from a block 79 of dove-tail shape adjustably secured by means of the set-screw 80 within a correspondingly formed longitudinal groove in the lower face of a transversely adjustable block 81 having upon its upper face the transverse tongue 82 of dove-tail shape which is fitted within a correspondingly shaped groove in the forward end portion of the primary cutter-lever 74 which is recessed in its lower face to receive said block 81. The lever 74 is provided adjacent its dove-tailed groove with a transverse screw aperture 83 terminating in countersunk recesses 84 in the opposite faces of the lever to receive the heads 85 of the adjusting screws 86 entering said screw aperture from different faces of the lever. The screw-heads 85 partially overlie the ends of the block 81 which they serve to confine between them. By retracting one of the screws 86 and correspondingly advancing the other, the block 81 may be shifted sidewise to provide the desired lateral adjustment of the primary cutter-member relative to the range of action of the stitch-forming mechanism; while the loosening of the set-screw 80 permits the endwise adjustment of the knife 78 parallel with the direction of feed of the work relatively to the stitch-forming mechanism. As the cutter-levers 74 and 75 are fitted closely upon the fulcrum-pin 72 sustained against bodily movement in the spaced lugs 69 of the slide-block 67, it will be seen that the upper and lower cutter-members are maintained permanently in register, each with the other, and retained a fixed distance from the fulcrum-pin in all positions of the cutting mechanism. The longer end portions of the cutter-levers rearward of the fulcrum-pin 71 have secured thereon adjacent their respective upper and lower edges by means of the fastening screws 87 the plates 88 each provided with a laterally extending pin 89 to which is attached one of the ends of a spring 90 for drawing the levers together to maintain the cutter normally open with its component members separated, as represented in Fig. 1.

Mounted in suitable bearings upon the base 1 is the transverse cutter actuating shaft 91 carrying a fixed collar 92 serving as a support for the straight edge 75$^x$ of the lower cutter-lever parallel with the bed-plate 2 and with the lower cutter-member 77. This collar performs the function of a cam in controlling the position of the lower cutter-member, and its periphery is shaped accordingly, being cylindrical in the present instance. As it engages the lever at a distance comparatively remote from the fulcrum-pin 71, it acts with a long leverage in conjunction with the fulcrum-pin, to sustain the thrust of the cutter-members and relieves the traveling fulcrum-block from any strain other than a direct downward thrust which is transmitted directly to the bed-plate 2, so that no tilting action is imposed upon the fulcrum-block by the action of the cutting mechanism. Fixed upon the shaft 91 adjacent the collar 92 is a cam 93 formed with an initially acting operative edge portion 94 and a subsequently acting portion 94$^x$ adjoining the same and but slightly eccentric to the axis of the shaft. Resting upon this cam, the greater portion of whose periphery is concentric with the shaft, is a wearing piece of angular cross section comprising the plate 95 and the wedge-shaped lip or flange 96 extending laterally therefrom and underlying the flat inner edge of the rearward end portion of the cutter-lever 74. The plate 95 is provided with the alined longitudinal slots 97 and 98 parallel with the upper face of the wedge 96, the former being entered by the headed guide-pin 99 projecting from the adjacent face of the lever 74, and the latter entered and guided by a shouldered stud 100 having a head 101 in which is swiveled the adjusting screw 102 entering a threaded aperture in the lug 103 carried by the plate 95. The screw 102 is prevented from endwise movement relative to the stud 100 by a fixed collar 104 between which and the screw-head is confined the head 101 of the stud. By turning the adjusting screw in one or the other direction the wearing piece is moved longitudinally of the cutter-lever 74 and the lower or wearing face of its wedge-shaped flange is thus moved toward and from the shaft relatively to the edge of the lever, for adjusting the initial position of the upper or primary cutter-member toward and from the lower or auxiliary cutter-member, whereby the cutting action of the mechanism may be varied.

One of the spaced lugs 69 of the fulcrum-block is formed with an undercut slot 105 to receive the head 106 of a stud-bolt 107 upon which is confined by means of the nut 108 the bushing 109 affording a pivotal stud embraced by the boss 110 at the forward end of a link-bar 111 having in its rearward end portion 112 a longitudinal slot 113 to form a yoke embracing a guide-block 114 fitted therein and mounted upon the actuating shaft 91. The portion 112 of the link-bar is provided, in alinement with the shaft 91 and stud 107, with a lateral stud 115 entering a cam-slot 116 in the forward face of a cam-wheel 117 fixed upon the shaft 91 by means of which to-and-fro operative movements toward and from the stitch-forming mechanism are imparted to the link-bar and communicated through the fulcrum-block and the fulcrum-pin 71 and to the cutter-levers 74 and 75 and the cutter-members carried thereby.

To the depending portion 69$^x$ of one of the lugs 69 of the fulcrum-block is secured by means of the screws 118 the shank 119 of the cam-bar 120 offset downwardly and forwardly from the same. The lower face of the cam-bar is provided near its outer end with a flat portion 121 merging rearwardly into the upwardly inclined operative portion 122 of a cam-notch terminating in a shoulder 123.

In the normal position of the parts preparatory to a buttonhole cutting and stitching operation, as represented in Figs. 1 and 3, the knob 44 of the arm 43 of the needle-throat frame rests upon the flat extreme lower portion 121 of the cam-bar so as to hold the frame 37 in upright position with the needle-throat 42 in initial operative relation with the stitch-forming mechanism. As the fulcrum-block is advanced to bring the cutting members into operative position for a buttonhole cutting operation, the cam-bar moves forward over the needle-throat frame arm 43 and fulcrum-pin 34 to bring the cam incline 122 above the contact knob or projection 44 to afford for the latter clearance to permit the tilting of the arm 43 and the retraction of the needle-throat, which is thrust aside substantially in the direction of movement of the cutter by engagement with the forward extremity of the lower cutter-member 77, and while in extreme forward position, the upper cutter-lever is tilted, at first rapidly, by engagement of the cam portion 94 of the cam 93 with its wearing piece, and subsequently much slower by the cam portion 94$^x$ into operative engagement with the lower cam member 77 to cut the buttonhole slit, all as represented in Fig. 2. The spring 90 serves, in conjunction with the operative portion 94$^y$ of the cam 93 in the separation of the cutter-members, and the fulcrum-block is simultaneously retracted to withdraw the cutter-levers 74 and 75 by means of the cam 116, the consequent retrograde movement of the cam-bar 120 causing the action of its incline 122 upon the arm 43 of the tilting frame 37 to restore the needle-throat to initial operative position in which it is locked by engagement of the extremity of the arm 43 with the flat outer portion of the cam-bar 120. This operative engagement of the arm 43 of the rocking frame with the cam-bar 120 continues throughout the stitching of the first side of the buttonhole, and until the stitching mechanism commences to turn for stitching the buttonhole eye. For maintaining the needle-throat locked against displacement during the continuance of the stitching operation, the bearing boss 22 is provided at its upper end with a segmental curb 124 affording a flat seat at substantially the level of the flat portion 121 of the cam-bar upon which is secured by means of fastening screws 125 the segmental stop-plate 126 whose inner edge projects inwardly from the curb 124 and affords a segmental continuation of the flat portion 121 of the cam-bar 120. During the turning of the stitch-forming mechanism from initial position represented in Figs. 1, 2 and 3, to and beyond the position represented in Fig. 6 into extreme side stitching position for the second side stitching operation, the extremity of the arm 43 passes from beneath the cam-bar 120 under the overhanging lip of the confining plate 126 where it is similarly confined against movement upon the fulcrum-stud 34 until the completion of a cycle of the machine wherein the stitching mechanism is returned by the rack-and-pinion actuating mechanism previously described to initial position, when the arm 43 is again brought beneath the cam-bar 120 preparatory to a succeeding cutting operation. It will thus be seen that the needle-throat is effectively locked in operative position, excepting during actual cutting operations, by engagement of the stop-screw 45 with the boss 26 of the loop-taker support on the one hand and successive engagement of the extremity of the arm 43 with the cam-bar 120 and the stop-plate 126 on the other hand.

As disclosed in my said application, Serial No. 535,340, the cutter-actuating shaft 91 carries a constantly driven grooved loose belt-wheel 127 having upon its inner face the annular rib 128 formed with peripherally spaced notches 129 to provide an annular series of coupling teeth adapted for engagement by a lateral coupling tooth afforded by the lug 130 upon the rearward face of a slide-block 131 which is mounted in a radial slideway 132$^x$ of the clutch-disk 132 fixed upon the shaft 91 adjacent the belt-wheel. The slide-block 131 is normally pressed outwardly by means of a spring 131$^x$ secured by a screw 132$^x$ upon the front face of the clutch-disk 132, and it has upon its inner or rearward face a stud 133 adapted for operative engagement with the eccentrically curved operative edge 134$^x$ of a clutch-controlling cam-plate 134 carried by a swinging lever 135 fulcrumed upon the stud-screw 136 mounted upon the machine bed and carrying a depending stud 137 entering a cam-groove 138 in the hub 139 of the clutch-disk 132. The cam-groove 138 is formed in practice with the abrupt jog 138$^x$ between the two extreme parallel operative portions at the starting position, as represented in Fig. 3, and has an inclined connecting portion 138$^y$ upon the opposite side, suitable to enable it to perform its function as hereinafter described.

The cam-plate 134 has at its lower end a rearwardly extending flange 140 fitted within a slideway intermediate the top of the bed-plate 2 and the bottom of a notched lug 141 secured upon the bed-plate and formed with a socket between the bottom of which and the lower portion of the cam-plate is interposed the spring 142 for normally pressing the cam-plate toward the face of the clutch-disk 132.

The cam-plate 134 is formed in its front face with a recess 143 in which is pivoted by means of the screw-stud 144 the latch-plate 145 provided with a pin 146 passing through a transverse slot 147 in the plate 134 and connected by means of a spring 148 to a screw-pin 149 upon the lever 135 so as to normally retain the latch-plate 145 with its forward or operative edge 150 projecting slightly beyond the cam-edge 134$^x$ of the plate 134 and spaced above the stop-shoulder 151 thereof slightly more than the thickness of the stud 133.

In the normal stopping position of the parts thus described, the slide-block, constituting a carrier for the coupling tooth 130, is at its extreme inner position, with the coupling tooth 130 withdrawn from engagement with the coupling teeth of the pulley-wheel 127 and with the stud 133 in contact with the stop-shoulder 151 of the cam-plate 134. The shifting of the clutch-controlling lever 135, by means presently to be described, so as to retract the cam-plate 134 from the adjacent face of the clutch-disk 132, carries the stud 137 from the outer to the inner position of the jog 138$^x$ of the cam-groove 138 and disengages the stop-shoulder 151 from the stud 133 of the slide-block or carrier 131, thus permitting the latter to move outwardly under the action of its spring 131$^x$ to introduce the coupling teeth 130 into engagement with the inclined inner face of one of the teeth of the annular rib 128 along which it rides into the intermediate notch 129 to couple the clutch-disk with the driving pulley-wheel 127. As the clutch-disk 132 nears the completion of a rotation, the clutch-controlling lever 135 is returned to initial position under the impulse of the spring 142 and the auxiliary action of the cam 138, thus bringing the cam-edge 134$^x$, eccentric to the cutter-shaft 91, into the path of movement of the stud 133 by means of which the carrier 131 is thrust inwardly to disengage its coupling tooth 130 from the pulley-wheel coupling tooth for uncoupling the driven from the driving member. As the stud 133 reaches initial position, it engages the stop-shoulder 151 of the cam-plate 134, and is prevented from rebounding by the adjacent edge of the latch-plate 145 which snaps into operative position as the stud 133 passes it and thrusts it inwardly in opposition to the spring 148. By the means thus described, the cutter-shaft 91 is given only a single rotation for each clutch-releasing action of the controlling lever 135.

As disclosed more fully in my Patent No. 864,144, of August 27, 1907, adjacent the loose driving pulley 11 is secured upon the main-shaft 6 the hub 152 of a clutch-wheel or disk 153 recessed at one portion of its periphery for the reception of a clutch-plate 154 interposed between said wheel and the wall of a chamber for the same in the loose pulley, said wheel also having a segmental recess upon the inner side of said plate for the reception of a cam-projection 155 upon a clutch-ring 156 which has a pivotal connection with said clutch-wheel by means of said projection to enable the clutch-ring to swing slightly relatively to the clutch-wheel on said projection as a center or pivot, thus causing the cammed or flattened outer portion of said projection to clamp the clutch-plate tightly against the wall of the chamber in the pulley 11 when the latter is to be connected to the driving shaft 6.

The clutch-ring 156 is provided with a pin 157 extending within a recess in the clutch-wheel 153 containing a spring 158 bearing against said pin so as to force the parts laterally into clutching position, as shown in Fig. 12. The clutch-ring 156 is provided at its periphery with a notch 159 for the reception of a lug or projection 160 on a vertically movable block 161 carried by the vibratory stop-motion lever 162 pivotally mounted in a bracket 163 on the base or frame of the machine by means of the rock-shaft 164 upon which said lever is rigidly mounted, a spring 165 inserted within a recess in said lever serving to press said block yieldingly downward and said clutch-ring 156 being provided with an eccentric or cam projection 166 to engage said lug or projection 160 to lift the same for braking the final rotation of the shaft 6 and causing said projection to enter the notch 159 and thereby cause the clutch-ring to swing slightly in opposition to the action of the spring 158 for release of the clutch-plate 154 when the stop-motion lever 162 has been tripped to arrest the rotation of the driving shaft.

The stop-lever 162 is provided at its upper end with a forwardly extending thrust-plate 167 between which and the standard 3 of the bracket-arm is interposed a spring 168 tending to throw the lower operative portion of the lever forwardly to bring the lug or projection 160 of the block 161 into operative relation with the clutch-ring 156.

Fixed upon one end of the pivoted rock-shaft 164 of the stop-lever 162 is a forwardly extending arm 169 carrying at its extremity a stud-screw 170 upon which is mounted the anti-friction roller 171 disposed adjacent the cam-wheel 117 and adapted to be engaged by the eccentric outer operative edge 172 of a cam-plate 173 secured by screws 174 upon the rearward face of said cam-wheel. As the cutter-shaft 91 completes a rotation in performing a cutting operation, the inner portion of the cam-edge 172 of the cam-plate 173 engages the roller 171 of the stop-lever shifting arm 169 and depresses the same, whereby the lug 160 is disengaged from the notch 159 of the cam-ring 156 to permit the latter to assume under the action of the spring 158 eccentric relation with the driving shaft 6 to cause the stud 155 to nip the clutch-plate 154 in coupling the clutch-wheel 153 to the loose pulley-wheel 11 and thereby initiate the action of the stitch-forming mechanism. As the arm 169 is depressed, it is locked from immediate return to initial position by the advance above its upper edge of the lateral finger 175 of one member 176 of a yoke formed at the upper end of a locking lever 177 which is pivotally mounted upon the fixed fulcrum-pin 178 and is drawn toward the rearward side of the machine by means of a spring 179 interposed between a pin 180 on said lever and an eye 181 upon the inner face of the base 1. The other member 182 of the yoke of the locking lever is also provided with a laterally projecting finger 183 the rearward edge of which lies in the path of movement of the extremity of the arm 184 of a tripping lever mounted upon the fixed fulcrum-stud 185 beneath the bed-plate 2 and having a forwardly extending bent arm 186 to which is adjustably secured the nose-piece 187 by means of the clamp-screw 188 of the latter entering a longitudinal slot 189 in the same, whereby the tooth 187ˣ at the operative end of the nose-piece may be adjusted toward and from the fulcrum 185 of the lever.

The rock-lever arm 184 is provided with a lateral stop-pin 190 whose extremity is adapted to engage the inner face of the side wall of the base 1 in one extreme position of the lever, under the action of the spring 179 through the yoked locking lever 177, while its tilting action to throw the locking lever backwardly to disengage the locking finger 175 from the shift-lever 169 is imparted by a tripping stud 191 formed upon the periphery of the feed cam-wheel 47.

It is evident that, in lieu of the adjustment of the nose-piece 187 above described, the tripping stud 191 may be adjustably mounted upon the feed cam-wheel similarly to the driving stud 195 of my Patent No. 751,239.

The clutch-controlling lever 135 is provided adjacent its fulcrum 136 with an inwardly extending arm 192 to which is secured by screws 193 the foot 194 of a rigid arm 195 extending back of the standard 3 of the bracket-arm and having a lateral stop-finger 196 whose extremity is presented to the forward face of the thrust-plate 167 for which it serves as a stop at certain times. The parts 167 and 196 are represented in Figs. 10 and 11 in the relation which they assume when the clutch-controlling lever 135 has been retracted to start the buttonhole cutting operation, as represented in Fig. 3.

Journaled in a bearing lug 197 depending from the head 5 of the bracket-arm is a horizontally arranged reciprocatory starting rod 198 carrying near its forward end the depending finger-piece 199 and pivotally connected at its rearward end by means of the pin 200 with the upper end of an upright shift-lever 201 fulcrumed upon a transverse pin 202 and having its rearward edge formed with a convex cam portion 203 adapted to engage the front face of the stop-arm 195 carried by the clutch-controlling lever 135. In the top of its forward portion the starting rod 198 is formed with a notch 204 adapted to be entered by the lower operative edge of the forward arm 205 of a detaining lever fulcrumed upon the shouldered screw-stud 206 affording the lower fastening device for the face plate and having a rearwardly extending arm 207 whose upper edge is normally pressed against the lower side of the rack-bar 60 under the impulse of a spring 208. The forward portion of the rack-bar is cut away upon its under side to permit the arm 205 to drop into the notch 204 of the starting rod for locking the latter against endwise movement excepting when the rack-bar is in its extreme forward and initial position, wherein the arm 207 rests upon the rounded bottom of the bar by which the locking arm 205 is maintained lifted above the notch 204. The starting rod is thus disengaged from the locking arm 205 in the initial position of the turning mechanism for the stitch-forming devices, but is thereafter locked from operative movement after the stitch-forming mechanism turns in the stitching of the eye of a buttonhole and until the stitch-forming mechanism is restored to initial position by the retrograde movement of the rack-bar 60, which latter causes the rocking of the detaining lever 205 207 in opposition to its spring and its consequent disengagement from the starting rod preparatory to a succeeding cutting and stitching operation. When the lever 135 is in normal stopping position preparatory to the performance of a cycle of operations, a pressure of the operator upon the finger-piece 199 causes the backward movement of the rod 198 and consequent engagement of the shift-lever 201 with the arm 195 of the clutch-controlling lever by means of which the latter is thrown backwardly in opposition to the spring 142, the stud 137 being shifted axially of the cam-cylinder 139 from the forward straight portion of the cam-groove 138 to the rearward portion. This movement causes the disengagement of the stud 133 of the slide-block 131 from the cam-plate 134 of the controlling lever 135 and permits the coupling of the loose and fixed wheels 127 and 132 and the consequent rotation of the cutter-shaft to produce a buttonhole cutting operation. As the cutter-shaft nears the completion of its rotary movement, the cam-plate 173 engages the roller 171 of the stop-lever shifting arm 169 whereby the shaft 164 is rocked and the stop-lever 162 is tilted to cause the operative engagement of the clutch-members of the driving shaft, the rotation of the latter causing the described operation of the stitch-forming mechanism to produce the edge or covering stitches along the sides and the rounded end of the buttonhole slit. After the cutter-shaft 91 has performed a partial rotation, the cam-plate 134 sustained by the lever 135 begins to resume operative position under the action of the spring 142 and the groove 138 of the cam-cylinder 139, and as the cutter-shaft approaches the end of its rotation, the stud 133 rides down the inclined cam-edge 134ˣ of the plate 134 and over the adjacent edge 150 of the latch-plate 145 into engagement with the stop-shoulder 151 where it is confined by means of the lower edge of the latch-plate, being simultaneously thrust inward to disengage its coupling tooth from a coupling tooth of the loose pulley-wheel 127. When the clutch-controlling lever 135 is shifted to start the cutter-shaft 91, the detaining member afforded by the finger 196 is shifted nearly into contact with the forward face of the thrust-plate 167 carried by the stop-lever, whereby the latter is prevented from being tilted while the cutting devices are in action, but as the lever 135 resumes initial position, the stop-finger 196 is advanced out of operative relation with the thrust-plate 167 so as to permit the shifting of the stop-lever 162 for coupling the shaft 6 with the driving pulley 11. When, however, the finger 196 is in the position last described, with the thrust-plate 167 in its forward position corresponding with the operative position of the stop-lever for coupling the shaft 6 to its actuating pulley, the clutch of the cutter-shaft is prevented from being actuated, as any attempted movement of the controlling lever 135 would bring the stop-finger 196 carried thereby into forcible engagement with the thrust-plate 167 of the starting lever which latter is locked in operative position by means of the spring-pressed locking lever 177.

It will thus be seen that effective means are provided in the present machine for preventing the starting of the main-shaft 6 while the cutter-shaft is in operation and for preventing the throwing of the cutter-shaft 91 into action during the rotation of the main-shaft. It will however be observed that, as the starting rod is locked from operative movement while the rack-bar 60 is retracted from initial position, the cutting mechanism can not be thrown into action even after the stitching mechanism has come to rest but before the latter has been turned into initial position for the beginning of a new cycle of operation of the machine.

From the foregoing description it will be obvious that the present cutting mechanism is not limited to association with stitch-forming mechanism of any particular type and that certain of its features are not confined to the cutting mechanism of the type herein shown and described, and that certain others of its features may be modified in construction and arrangement of the component parts without departure from the scope of the present invention.

Having thus set forth the nature of the invention, what I claim herein is:—

1. In a buttonhole cutting and stitching machine, the combination with stitch-forming mechanism, of a traveling fulcrum-block movable toward and from the stitch-forming mechanism, a transverse fulcrum-pin mounted in said block, a cutter-lever mounted upon said fulcrum-pin, a primary cutter-member mounted upon the forward end of said cutter-lever, a second cutter-member sustained by and movable with said fulcrum-block and positively maintained by the same permanently in register and adapted to coöperate with said primary cutter-member, and actuating means applied to said cutter-lever whereby said cutter-members are closed upon the work.

2. In a buttonhole cutting and stitching machine, the combination with stitch-forming mechanism, of a traveling fulcrum-block movable toward and from the stitch-forming mechanism, a transverse fulcrum-pin mounted in said block, a cutter-lever mounted upon said fulcrum-pin, a primary cutter-member mounted upon the forward end of said cutter-lever, a second cutter-member sustained by and movable with said fulcrum-block and coöperating with said primary cutter-member, actuating means independent of the stitch-forming mechanism and connected with said cutter-lever whereby said cutter-members are closed upon the work, and means independent of said actuating means for imparting to-and-fro movements to said fulcrum-block.

3. In a buttonhole cutting and stitching machine, the combination with the frame including a bed-plate having a longitudinal slideway and stitch-forming mechanism therein, of a traveling fulcrum-block mounted in the slideway of said bed-plate and movable toward and from the stitch-forming mechanism, a transverse fulcrum-pin mounted in bearings fixed upon said block, a cutter-lever mounted upon said fulcrum-pin, a primary cutter-member mounted upon the forward end of said cutter-lever and maintained thereon a fixed distance from said fulcrum-pin, a second cutter-member sustained by and movable with said fulcrum-block and coöperating with said primary cutter-member, and actuating means applied to said cutter-lever whereby said cutter-members are closed upon the work.

4. In a buttonhole cutting and stitching machine, the combination with stitch-forming mechanism, of a traveling fulcrum-block movable toward and from the stitch-forming mechanism, a transverse fulcrum-pin mounted in said block, a cutter-lever mounted upon said fulcrum-pin and having portions extending forwardly and rearwardly therefrom, a primary cutter-member mounted upon the forward portion of said cutter-lever, a second cutter-member sustained by and movable with said fulcrum-block and coöperating with said primary cutter-member, an actuating shaft extending beneath and transversely of the rearward portion of said cutter-lever, and a cam upon said shaft adapted for engagement with the cutter-lever.

5. In a buttonhole cutting and stitching machine, the combination with stitch-forming mechanism, of a traveling fulcrum-block movable toward and from the stitch-forming mechanism, a transverse fulcrum-pin mounted in said block, a cutter-lever mounted upon said fulcrum-pin and having portions extending forwardly and rearwardly therefrom, a primary cutter-member mounted upon the forward portion of said cutter-lever, a second cutter-member sustained by and movable with said fulcrum-block and coöperating with said primary cutter-member, an actuating shaft extending beneath and transversely of the rearward portion of said cutter-lever, and a cam fixed upon said shaft and provided with relatively abrupt and gradual operative portions acting successively upon said cutter-lever for imparting to the primary cutter-member a two-stage closing movement upon the other cutter-member.

6. In a buttonhole cutting and stitching machine, the combination with stitch-forming mechanism, of two cutter-levers carrying coöperating cutter-members, a common fulcrum upon which said cutter-levers are mounted, a transverse actuating shaft disposed between said cutter-levers, means upon said shaft for holding one of said cutter-levers against tilting movement upon said fulcrum, and means carried by said shaft for rocking the other of said levers upon its fulcrum whereby the cutter-members are brought into cutting relation.

7. In a buttonhole cutting and stitching machine, the combination with stitch-forming mechanism, of two cutter-levers carrying coöperating cutter-members, a common fulcrum upon which said cutter-levers are mounted, a transverse actuating shaft disposed between said cutter-levers, a cylindrical stop-collar carried by said shaft and disposed in operative relation with one of said cutter-levers, a spring for drawing said cutter-levers together and toward said transverse shaft, and an actuating cam carried by said shaft and disposed in operative relation with the other of said cutter-levers.

8. In a buttonhole cutting and stitching machine, the combination with stitch-forming mechanism, of two cutter-levers carrying at their forward ends coöperating cutter-members, a traveling fulcrum-block movable toward and from the stitch-forming mechanism, a fulcrum carried by said fulcrum-block and upon which said cutter-levers are mounted intermediate their ends, a transverse actuating shaft disposed between the rearward end portions of such cutter-levers, and means upon said shaft for spreading and otherwise controlling the positions of the adjacent portions of the cutter-levers for imparting relative operative movements to their cutter-members.

9. In a buttonhole cutting and stitching machine, the combination with stitch-forming mechanism, of two cutter-levers carrying at their forward ends coöperating cutter-members, a traveling fulcrum-block movable toward and from the stitch-forming mechanism, a fulcrum carried by said fulcrum-block upon which said cutter-levers are mounted intermediate their ends, a transverse actuating shaft disposed between the rearward end portions of such cutter-levers, a spring for drawing together the rearward end portions of said cutter-levers, and a cam and adjacent collar mounted upon said shaft in operative relation respectively with the rearward ends of said levers.

10. In a buttonhole cutting and stitching machine, the combination with stitch-forming mechanism, of two cutter-levers carrying at their forward ends coöperating cutter-members, a sliding fulcrum-block movable toward and from the stitch-forming mechanism and means for sustaining the same, a fulcrum carried by said fulcrum-block upon which said cutter-levers are mounted intermediate their ends, a transverse actuating shaft disposed between the rearward and portions of such cutter-levers, a spring for drawing together the rearward end portions of said cutter-levers, a cam and adjacent collar mounted upon said shaft in operative relation respectively with the rearward ends of said levers, a second cam on said transverse shaft, and a link-bar pivotally connected at one end to said fulcrum-block and yoked at the other end to embrace said transverse shaft and provided with a shoulder engaging the second named cam.

11. In a buttonhole cutting and stitching machine, the combination with stitch-forming mechanism, of a vibratory cutter-lever carrying upon its forward end a primary cutter-member, a fulcrum upon which said cutter-lever is mounted intermediate its ends, a second cutter-member coöperating with the primary cutter-member and provided with means for sustaining the same, an actuating shaft disposed transversely of said cutter-lever, a cam thereon, a wearing piece carried by the cutter-lever in operative relation with said cam and having its operative face adjustable toward and from said shaft relatively to the cutter-lever, and means connected with said cutter-lever for maintaining the wearing piece in operative relation with said cam.

12. In a buttonhole cutting and stitching machine, the combination with stitch-forming mechanism, of a vibratory cutter-lever carrying upon its forward end a primary cutter-member, a fulcrum upon which said cutter-lever is mounted intermediate its ends, a second cutter-member coöperating with the primary cutter-member and provided with means for sustaining the same, an actuating shaft disposed transversely of said cutter-lever, a cam thereon, and a wearing piece having a wedge-shaped operative portion overlying the edge of the cutter-lever and intermediate the same and said cam and provided with means for its adjustment lengthwise of said lever.

13. In a buttonhole cutting and stitching machine, the combination with stitch-forming mechanism, of a vibratory cutter-lever, a fulcrum upon which said cutter-lever is mounted intermediate its ends, an actuating shaft disposed transversely of said cutter-lever, a cam upon said shaft in operative relation with the cutter-lever, a transversely adjustable block carried by the forward end of said cutter-lever, a cutting knife sustained by said block, an anvil disposed beneath said knife and provided with means for sustaining it, and means for effecting simultaneously the longitudinal adjustment of the operative positions of said cutting knife and anvil.

14. In a buttonhole cutting and stitching machine, the combination with stitch-forming mechanism including a reciprocating needle, complemental loop-taking mechanism, and a needle-throat movable independently of the loop-taking mechanism, of a traveling cutter-carriage movable toward and from the stitch-forming mechanism, actuating means therefor, coöperating upper and lower cutter-members mounted upon said carriage, actuating means therefor, and positively acting means mounted upon said carriage for tilting said needle-throat out of operative position when the cutter-carriage advances to perform a cutting operation and for returning and locking said needle-throat in operative position upon the recession of the cutter-carriage.

15. In a buttonhole cutting and stitching machine, the combination with stitch-forming mechanism including a reciprocating needle, a needle-throat, and a tilting frame for said needle-throat having a fulcrum transverse to the needle-path and provided with a laterally extending arm, of a traveling cutter-carriage movable toward and from the stitch-forming mechanism, actuating means therefor, coöperating upper and lower cutter-members mounted upon said carriage, actuating means therefor, and means including a cam-member mounted upon said cutter-carriage and engaging the lateral arm of said tilting frame whereby said needle-throat is shifted into and out of operative relation with the stitch-forming mechanism and is positively maintained in both extreme positions.

16. In a buttonhole cutting and stitching machine, the combination with overseaming stitch-forming mechanism including a reciprocating needle and a coöperating loop-taker, a rotary loop-taker support, rotating means for said stitch-forming mechanism and the loop-taker support, and a needle-throat mounted upon said loop-taker support and movable transversely of the needle-path, of a traveling cutter-carriage movable toward and from the stitch-forming mechanism, actuating means therefor, coöperating upper and lower cutter-members mounted upon said carriage, actuating means therefor, means carried by the cutter-carriage for shifting and positively controlling the movements of the needle-throat into and out of operative relation with the needle when the cutting mechanism advances for cutting a buttonhole in initial position of the stitch-forming mechanism, and means carried by the loop-taker support for maintaining the needle-throat in operative position when the stitch-forming mechanism is rotated from initial position.

17. In a buttonhole cutting and stitching machine, the combination with overseaming stitch-forming mechanism including a reciprocating needle and a coöperating loop-taker, a rotary loop-taker support, rotating means for said stitch-forming mechanism and the loop-taker support, a needle-throat, and a tilting frame for said needle-throat having a fulcrum sustained by and transverse to the axis of rotation of the loop-taker support and provided with a laterally extending arm, of a traveling cutter-carriage movable toward and from the stitch-forming mechanism, actuating means therefor, coöperating upper and lower cutter-members mounted upon said carriage, actuating means therefor, means including a cam-member mounted upon said cutter-carriage and engaging the lateral arm of said tilting frame while the stitch-forming mechanism is in initial position whereby said needle-throat is shifted into and out of operative position and is locked in both extreme positions, and a segmental stop-plate carried by the loop-taker support and coöperating with said cam member in retaining the needle-throat in operative relation with the stitch-forming mechanism while the latter is turned out of initial position during a portion of the stitching operation.

18. In a buttonhole stitching machine, the combination with a buttonhole cutting device, a cutter-shaft, and operative connections between said shaft and the cutting device, of a clutch-member fixed upon the cutter-shaft, a carrier movably mounted thereon and provided with a coupling tooth, a loose driving-wheel mounted upon said shaft adjacent the clutch-member and provided with a coupling tooth adapted for operative engagement with the coupling tooth of said fixed member, and a clutch-controlling cam-plate movable toward and from the fixed clutch-member and formed with an operative edge in eccentric relation to said shaft and adapted for operative engagement with said movable carrier to disengage its coupling tooth from that of said driving-wheel.

19. In a buttonhole stitching machine, the combination with a buttonhole cutting device, a cutter-shaft, and operative connections between said shaft and the cutting device, of a clutch-member fixed upon the cutter-shaft, a carrier movably mounted thereon and provided with a coupling tooth, a loose driving-wheel mounted upon said shaft adjacent the clutch-member and provided with a coupling tooth adapted for operative engagement with the coupling tooth of said fixed member, a clutch-controlling cam-plate movable toward and from the fixed clutch-member and formed with an operative edge in eccentric relation to said shaft and adapted for operative engagement with said movable carrier to disengage its coupling tooth from that of said driving-wheel, manually actuated means for shifting said cam-plate out of operative relation with said carrier, and automatically acting means for returning it to operative position prior to the completion of a rotation of the cutter-shaft.

20. In a buttonhole stitching machine, the combination with stitch-forming mechanism, a main-shaft, a driving pulley loosely mounted thereon, and a stop-motion device including a vibratory stop-lever whereby the main-shaft may be connected to and disconnected from the driving pulley, of a buttonhole cutting device, a cutter-shaft, operative connections between said cutter-shaft and the cutting device, a loose driving-wheel upon the cutter-shaft, a clutch-device upon the cutter-shaft, and a movable controlling member therefor adapted to effect the connection and disconnection of the driving-wheel and the cutter-shaft and carrying a detaining member normally lying in the path of movement of and adapted to prevent the actuation of the stop-lever while said controlling member is in clutching position.

21. In a buttonhole stitching machine, the combination with stitch-forming mechanism, a main-shaft, a driving pulley loosely mounted thereon, and a stop-motion device for connecting said driving pulley and the main-shaft, of a buttonhole cutting device, a cutter-shaft, operative connections between the cutter-shaft and the cutting device, a loose driving-wheel upon the cutter-shaft, a clutch-device for connecting the driving-wheel and the cutter-shaft, successively operable means whereby each of said loose driving members may be coupled to its respective shaft, and locking means comprising interengaging elements sustained independently of both of said shafts and adapted to prevent the operation of each of said coupling means while the other is in coupling relation.

22. In a buttonhole stitching machine, the combination with stitch-forming mechanism, a main-shaft, a driving-pulley loosely mounted thereon, and a stop-motion device for connecting said driving-pulley and the main-shaft, of a buttonhole cutting device, a cutter-shaft, operative connections between the cutter-shaft and the cutting device, a loose driving-wheel upon the cutter-shaft, a clutch device for connecting the driving-wheel and the cutter-shaft, and means carried by an operative part of one of the connecting devices intermediate the loose driving member and its respective shaft whereby the other of said shafts is forcibly maintained disconnected from its respective loose driving member while said connecting device is in operation.

23. In a buttonhole stitching machine, the combination with stitch-forming mechanism, a main-shaft, a driving pulley loosely mounted thereon, and a stop-motion device including a cam member connected to and rotating with the main-shaft and a vibrating stop-lever having a laterally extending rigid arm and carrying an element directly engaging said cam member whereby the main-shaft may be set in motion and arrested, of a buttonhole cutting device, a cutter-shaft, operative connections between the cutter-shaft and the cutting device, means including a clutch-device whereby a single rotation is imparted to the cutter-shaft, and a cam mounted on the cutter-shaft and adapted to engage the lateral arm of said stop-lever for throwing the latter to start the main-shaft.

24. In a buttonhole stitching machine, the combination with stitch-forming mechanism, a rotary cam-wheel from which relative feeding movements between the stitch-forming mechanism and the work are derived, a main-shaft, a driving pulley loosely mounted thereon, and a stop-motion device including a spring-pressed vibrating stop-lever whereby the main-shaft may be connected to and disconnected from the driving pulley, of a buttonhole cutting device, a cutter-shaft, operative connections between the cutter-shaft and the cutting device, means including a clutch-device whereby a single rotation is imparted to the cutter-shaft, a cam mounted on the cutter-shaft, means operated by said cam for throwing the stop-lever to start the main-shaft, a pivotally mounted spring-pressed latch-lever provided with a lateral detaining lug adapted to engage the lateral arm of the stop-lever, a tripping stud on the said cam-wheel, and a rock-lever mounted upon a fixed fulcrum and having one arm in operative relation with said latch-lever and a second arm lying in the path of movement of said tripping stud.

25. In a buttonhole stitching machine, the combination with stitch-forming mechanism, a rotary cam-wheel from which relative feeding movements between the stitch-forming mechanism and the work are derived, a main-shaft, a driving pulley loosely mounted thereon, and a stop-motion device including a spring-pressed vibrating stop-lever whereby the main-shaft may be connected to and disconnected from the driving-pulley, of a buttonhole cutting device, a cutter-shaft, operative connections between the cutter-shaft and the cutting device, means including a clutch-device whereby a single rotation is imparted to the cutter-shaft, a cam mounted on the cutter-shaft, means operated by said cam for throwing the stop-lever to start the main-shaft, a pivotally mounted spring-pressed latch-lever adapted for detaining said stop-lever in retracted position, a tripping stud on the feed cam-wheel, and a rock-lever mounted upon a fixed fulcrum and having one arm in operative relation with said latch-lever, and a second arm having a nose-piece lying in the path of movement of said tripping stud and adjustable toward and from the fulcrum of said rock-lever.

26. In a buttonhole stitching machine, the combination with stitch-forming mechanism, a main-shaft, a driving-pulley loosely mounted thereon, and a stop-motion device including a vibrating stop-lever whereby the main-shaft may be connected to and disconnected from the driving-pulley, of a buttonhole cutting device, cutter-actuating means including a cutter-shaft, operative connections between the cutter-shaft and the cutting device, a connection between the cutter-actuating means and the stop-lever whereby the latter is actuated to start the main-shaft, a loose driving-wheel upon the cutter-shaft, a clutch device including a movable controlling member for connecting and disconnecting the driving-wheel and the cutter-shaft, a rigid detaining member carried by said controlling member and normally lying in the path of movement of said stop-lever and adapted for engagement with the same, a starting rod with one end disposed adjacent the stitch-forming mechanism, and a connection between the other end of said starting rod and said controlling member for shifting the latter.

27. In a buttonhole stitching machine, the combination with stitch-forming mechanism, a main-shaft, a driving-pulley loosely mounted thereon, and a stop-motion device including a vibrating stop-lever whereby the main-shaft may be connected to and disconnected from the driving-pulley, of a buttonhole cutting device, cutter-actuating means including a cutter-shaft, operative connections between the cutter-shaft and the cutting device, a connection between the cutter-actuating means and the stop-lever whereby the latter is actuated to start the main-shaft, a loose driving-wheel upon the cutter-shaft, a clutch device including a swinging lever for connecting and disconnecting the driving wheel to and from the cutter-shaft, a rigid stop-arm carried by said swinging lever and normally lying in the path of movement of said stop-lever and adapted for engagement with the same, a starting rod with one end disposed adjacent the stitch-forming mechanism, and a lever mounted upon a fixed fulcrum and connected with the opposite end of said starting rod and adapted to engage the rigid arm of said swinging lever for starting the machine.

28. In a buttonhole stitching machine, the combination with stitch-forming mechanism, and turning means for imparting thereto a partial rotation during the stitching of the eye of an eyelet-end buttonhole and a turning movement to initial position thereafter, of buttonhole cutting mechanism independent of the stitch-forming mechanism, successively operable means whereby the operation of the stitch-forming and cutting mechanisms and the return to initial position of the stitch-forming mechanism after an initial turning movement may be effected, and means for locking each of said means against operation throughout the period during which either of the others is performing its described function.

29. In a button hole stitching machine, the combination with stitch-forming mechanism and buttonhole cutting mechanism, of independently and successively operable actuating means for said mechanisms, means for controlling the operation of each of said actuating means, and locking means sustained entirely independently of both of said actuating means and comprising interengaging elements adapted to prevent the operation of each of said mechanisms while the other is in operation.

30. In a buttonhole stitching machine, the combination with stitch-forming mechanism and buttonhole cutting mechanism, of independently and successively operable actuating means for said mechanisms, means for controlling the operation of each of said actuating means, and locking means comprising reciprocatory interengaging elements each movable between extreme positions corresponding respectively with the operative and inoperative relations of said actuating means with the mechanism adapted to be driven thereby, said elements being adapted each to prevent the movement of the other in one of its extreme positions and to be prevented from movement by the other in its other extreme position.

In testimony whereof, I have signed my name to this specification, in the presence of two subscribing witnesses.

EDWARD B. ALLEN.

Witnesses:
NEWTON H. HOYT,
E. L. TOLLES.